United States Patent Office 3,144,341
Patented Aug. 11, 1964

---

3,144,341
LACTATE COMPOUND EMULSIFIERS AND SHORTENING CONTAINING THE SAME
Stuart W. Thompson, Upper Saddle River, N.J., assignor to Lever Brothers Company, New York, N.Y., a corporation of Maine
No Drawing. Filed Apr. 18, 1961, Ser. No. 103,733
8 Claims. (Cl. 99—123)

The present invention relates to a novel group of emulsifying agents particularly suitable as shortening addition agents in cake mixes and the like.

Shortening agents are usually produced from tri-glycerides containing various amounts and kinds of emulsifying agents. The glycerides may be partially or completely hydrogenated and/or interesterified with other activating groups. The prior art is replete with various shortening compositions containing emulsifiers to improve the properties of the shortening.

It is an object of the present invention to provide an emulsifying agent which will improve the qualities of edible products to which it is added.

It is a further object of the present invention to provide an emulsifying agent which when added to conventional glyceride shortenings improves the properties of the compositions containing the shortening.

These and other objects are accomplished by the use of stearyl lactoyl lactate and cetyl lactoyl lactate as emulsifiers in cake mixes, dessert toppings, and other edible products containing shortening ingredients.

Theoretically speaking, the reaction product of one mole of stearyl alcohol and two moles of lactic acid should yield stearyl lactoyl lactate:

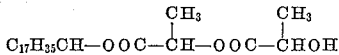

Actually, a 10% excess of the acid is recommended for best resuts. The stearyl lactoyl lactate used in the following formulations was prepared as follows:

339 grams of stearyl alcohol (Du Pont Lorol 28) were heated in a flask to 165° C. with mechanical agitation under a nitrogen sweep and 234 grams of lactic acid were added drop-wise. This amount of lactic acid represents about a 10% excess of that amount theoretically required to obtain the desired compound. The reaction was continued at the same temperature (165° C.) until 74 grams of water were collected in a cold trap through which the sweep gas passed. The product was cooled, washed with 110 grams of a saturated sodium sulphate solution, and filtered. The hydroxyl value of the product was 136.4 (theoretical 135.2).

Cetyl lactoyl lactate was prepared according to this same method by substituting cetyl alcohol for the stearyl alcohol.

Stearyl lactoyl lactate is particularly effective when utilized as a supplemental emulsifying agent with saturated fatty acid mono-diglycerides in cake mixes containing less than the normal amount of shortening agent and a higher than normal amount of liquid ingredients. Although minor amounts of unsaturated fatty acid mono-diglycerides may be tolerated, it is preferred for optimum results to utilize only the saturated fatty acid mono-diglyceride emulsifiers.

As a general rule, the amount of stearyl lactoyl lactate and mono-diglyceride contained in a shortening may be widely varied. The optimum proportions of each of these emulsifiers in a cake mix shortening or in any edible product can easily be determined by the routine formulator. For example, desirable effects may be obtained by including as little as about 2% of the lactylated ingredient in a shortening which contains about 2% monoglycerides (4% mono-diglyceride concentrate). For best results however, the shortening ingredient should contain at least about 4% monoglyceride and about 8% or more of the lactylated ingredient. The lower the proportion of shortening in the cake, the higher becomes the optimum level of emulsifiers in the shortening. Where a combination of stearyl lactoyl lactate and cetyl lactoyl lactate are to be used in a shortening, these materials are preferably present in amounts of 1–6 parts by weight of the latter to 3–4.5 parts of the former to 4–12 parts of mono-diglyceride concentrate, the combined emulsifiers comprising 8% or more of the shortening.

A cake mix recipe using stearyl lactoyl lactate is shown in Example 1. The preparation of an aerosol dessert topping containing the novel emulsifier is disclosed in Example 2. The third example shows stearyl lactoyl lactate as an effective fluid shortening ingredient in a shortening formulation.

The invention will now be illustrated in more detail by the following examples.

EXAMPLE 1

In this example stearyl lactoyl lactate is used as a supplemental emulsifier in a cake mix containing a high amount of liquid ingredients. The data in Table I was obtained from cakes prepared according to the following recipe.

| Ingredient: | Grams |
|---|---|
| Cake flour | 200 |
| Sugar | 232 |
| Non-fat milk solids | 17 |
| Baking powder | 10 |
| Salt | 6 |
| Shortening | 73 |
| Whole eggs | 100 |
| Water | 237 |

The cakes were prepared according to the following procedure: The dry ingredients were blended with the shortening in a Kitchen Aid Mixer. 157 grams of water were added and the mix was blended for 30 seconds at speed 1 followed by speed 4 for two minutes. The eggs were added at speed 1 and blended for one minute at speed 4. The remaining water (79 grams) was added during a 10 to 15 second period at speed 1 after which the sides of the bowl were scraped down with a spatula. The mix was then beaten for one minute more at speed 1. The batter was scaled 410 grams into each of two 8 inch layer pans. The cakes were then baked at 350° F. until done (about 35 minutes). Volumes of the cakes were measured by the Seed Displacement Method.

*Table I*

EFFECT OF ADDING MONO-DIGLYCERIDES AND STEARYL LACTOYL LACTATE SINGLY AND IN COMBINATION TO A SHORTENING[1] ON THE VOLUME IN CC. OF LAYER CAKES OBTAINED THEREWITH

| Mono-diglycerides,[2] (percent in Shortening) | Stearyl Lactoyl Lactate (percent in Shortening) | | | | |
|---|---|---|---|---|---|
| | 0 | 4 | 8 | 12 | 16 |
| 0 | | 800 | 870 | 875 | 970 |
| 4 | 1,020 | 1,125 | 1,260 | 1,345 | |
| 8 | 1,090 | 1,145 | 1,315 | | |
| 12 | 1,115 | | | | |
| 16 | 1,100 | | | | |

[1] Soybean oil hydrogenated to 85 IV.
[2] A mono-diglyceride concentrate prepared from fully hydrogenated cottonseed oil—approximately 45% monoglycerides.

From the above data, it can be seen that stearyl lactoyl lactate alone is somewhat ineffective as an emulsifier in this type of cake mix. The mono-diglycerides alone were somewhat better but still unsatisfactory. A markedly
The grain texture and crust appearance of the cakes as
better cake was obtained with the combination of agents.
well as the volume were improved by using a combination
of emulsifiers.

Cetyl lactoyl lactate was less effective than stearyl lactoyl lactate in the previously described cake test. However, mixtures of the cetyl and stearyl lactoyl lactate acted like the latter. This can be seen in the following data shown in Table II.

*Table II*

| Percent in Shortening [1] | | Cake Vol. in cc. |
|---|---|---|
| Stearyl Lactoyl Lactate | Cetyl Lactoyl Lactate | |
| 0 | 6 | 1,125 |
| 4.5 | 1.5 | 1,325 |
| 3 | 1 | 1,350 |

[1] Soybean oil hydrogenated to 85 IV and containing 8% C16-C18 saturated fatty acid mono-diglycerides as well as the stearyl and/or cetyl lactoyl lactate emulsifier.

It is probable that during the preparation of the stearyl lactoyl lactate, some stearyl lactate and other compounds formed from one stearyl alcohol and 3 or more lactic acid molecules will be formed. It was therefore desirable to check the effect of varying the proportion of lactic acid on the properties of the desired emulsifier. Products were made where one mole of alcohol and three moles of lactic acid were reacted. Data obtained from these emulsifiers in the previously described cake test is shown in Table III.

*Table III*

EFFECT OF LACTIC ACID-STEARYL ALCOHOL RATIO IN EMULSIFIER ON ITS CAKE PERFORMANCE

| Mole Acid Per Mole Alcohol in Emulsifier | Cake Vol. in cc. |
|---|---|
| 1 | 1,245 |
| 2 | 1,335 |
| 3 | 1,345 |

For the tests in Table III the shortening used comprised 6% of the lactate emulsifier and about 8% of C16–C18 saturated fatty acid monoglycerides in 85 IV hydrogenated soybean oil. This data shows that stearyl lactate is less effective than the desired stearyl lactoyl lactate, but that the reaction of the latter with an additional mole of lactic acid offers no appreciable advantages.

The Seed Displacement Method mentioned in the above tests is performed as follows: Cake volumes are determined with the aid of an aluminum pan approximately 9 inches in diameter and 2 inches deep having a capacity of 2173 cc., an 8 inch diameter wooden block having the shape of a layer cake and a volume of 1110 cc., and a quantity of rape seed. The rape seed gravity is determined by weighing the quantity required to fill the pan with the cake block inside it and dividing this weight in grams by the capacity of the pan less the volume of the block, in cc. The difference between the weight of seed required to fill the pan with a layer cake inside it and the weight of seed required to fill the pan with the wooden block inside it, divided by the specific gravity of the seed, determines the difference in volume between the test cake and wooden cake block. This difference added or subtracted to the volume of the cake block, depending upon whether the test cake is larger or smaller than the block, gives the volume of the test cake.

EXAMPLE 2

Stearyl lactoyl lactate was found to be a desirable emulsifier for use in an aerosol dessert topping. An emulsifier was prepared utilizing the following.

| Ingredient: | Percent |
|---|---|
| Hydrogenated vegetable oil | 30.0 |
| Stearyl lactoyl lactate | 0.3 |
| Glycerol mono-stearate | 0.05 |
| Sucrose | 10.5 |
| Salt | 0.1 |
| Carboxymethylcellulose | 0.1 |
| Soy protein solution (2%) | 25.0 |
| Flavor | 0.09 |
| Water | To 100.00 |

This emulsion was filled (9½ fluid ounces) into a conventional whipped topping-type can (16 fluid oz. capacity) and charged with an 85% nitrous oxide–15% carbon dioxide mixture to an equilibrium pressure of about 90 p.s.i. at 50° F. The dispensed whipped topping had desirable textural properties and the emulsion remained fluid in the can during four months' storage at 50° F.

In contrast, a similar product, except for the use of glycerol monostearate in place of the stearyl lactoyl lactate, had a foamy, marshmallowy, shiny, less desirable appearance and consistency when dispensed. Another similar product containing an equivalent amount of monoglycerides of cottonseed oil fatty acids instead of the stearyl lactoyl lactate, lost fluidity in the can during one month's storage at 50° F.

EXAMPLE 3

A blend of 91% deodorized cottonseed oil, 5% stearyl lactoyl lactate, 2% mono-diglycerides of fully hydrogenated cottonseed oil (40% monoglycerides) and 2% fully hydrogenated cottonseed oil was chilled from the melt, while being agitated, in a beaker immersed in a water-ice bath. The resulting suspension of solids in liquid oil remained pourable even after storage at room temperature for one month. This fluid shortening compared favorably with a well-known commercially available plastic emulsifier shortening when used to prepare a household-type white layer cake. Both shortenings gave cakes of similar texture, volume and quality. This shows that stearyl lactoyl lactate is effective as a fluid shortening agent.

It will be apparent that the embodiments shown are only exemplary and that various modifications can be made in materials and arrangement within the scope of the invention as defined in the appended claims.

I claim:

1. A shortening agent comprising an edible triglyceride fat and an emulsifier comprising a mono-diglyceride and a compound selected from the group consisting of stearyl lactoyl lactate, cetyl lactoyl lactate, and mixtures thereof.

2. A sortening agent comprising an edible triglyceride fat, from 4–8% by weight of an edible mono-diglyceride and about 4–12% by weight of stearyl lactoyl lactate.

3. An emulsifying agent comprising an edible mono-diglyceride, and a compound selected from the group consisting of stearyl lactoyl lactate, cetyl lactoyl lactate, and mixtures thereof.

4. A shortening agent comprising an edible triglyceride fat, about 3–4.5% stearyl lactoyl lactate, about 1–6% cetyl lactoyl lactate, and about 4–12% by weight of an edible mono-diglyceride.

5. A cake mix containing a shortening agent comprising an edible triglyceride fat and an emulsifier comprising an edible mono-diglyceride and a compound selected from the group consisting of stearyl lactoyl lactate, cetyl lactoyl lactate, and mixtures thereof.

6. In a cake mix, a shortening ingredient comprising a triglyceride fat, from about 4–8% by weight of an edible saturated fatty acid mono-diglyceride and about 4–12% of stearyl lactoyl lactate.

7. An aerosol whipped topping containing stearyl lactoyl lactate as an emulsifying agent.

8. In an aerosol whipped topping, an emulsifier comprising an edible mono-diglyceride and a compound selected from the group consisting of stearyl lactoyl lactate, cetyl lactoyl lactate, and mixtures thereof.

References Cited in the file of this patent

UNITED STATES PATENTS

| | | |
|---|---|---|
| Re 25,264 | Berndt et al. | Oct. 16, 1962 |
| 2,690,971 | Iveson | Oct. 5, 1954 |
| 2,864,705 | Schulman | Dec. 16, 1958 |
| 2,915,551 | Wolf et al. | Dec. 1, 1959 |
| 2,950,313 | Kirkpatrick | Aug. 23, 1960 |
| 2,973,270 | Thompson et al. | Feb. 28, 1961 |
| 3,004,853 | Julian et al. | Oct. 17, 1961 |
| 3,051,577 | Babayan | Aug. 28, 1962 |